June 27, 1933.  R. D. CONKLIN  1,915,292
COMPRESSIBLE MAT ELECTRIC TREADLE
Filed May 21, 1932
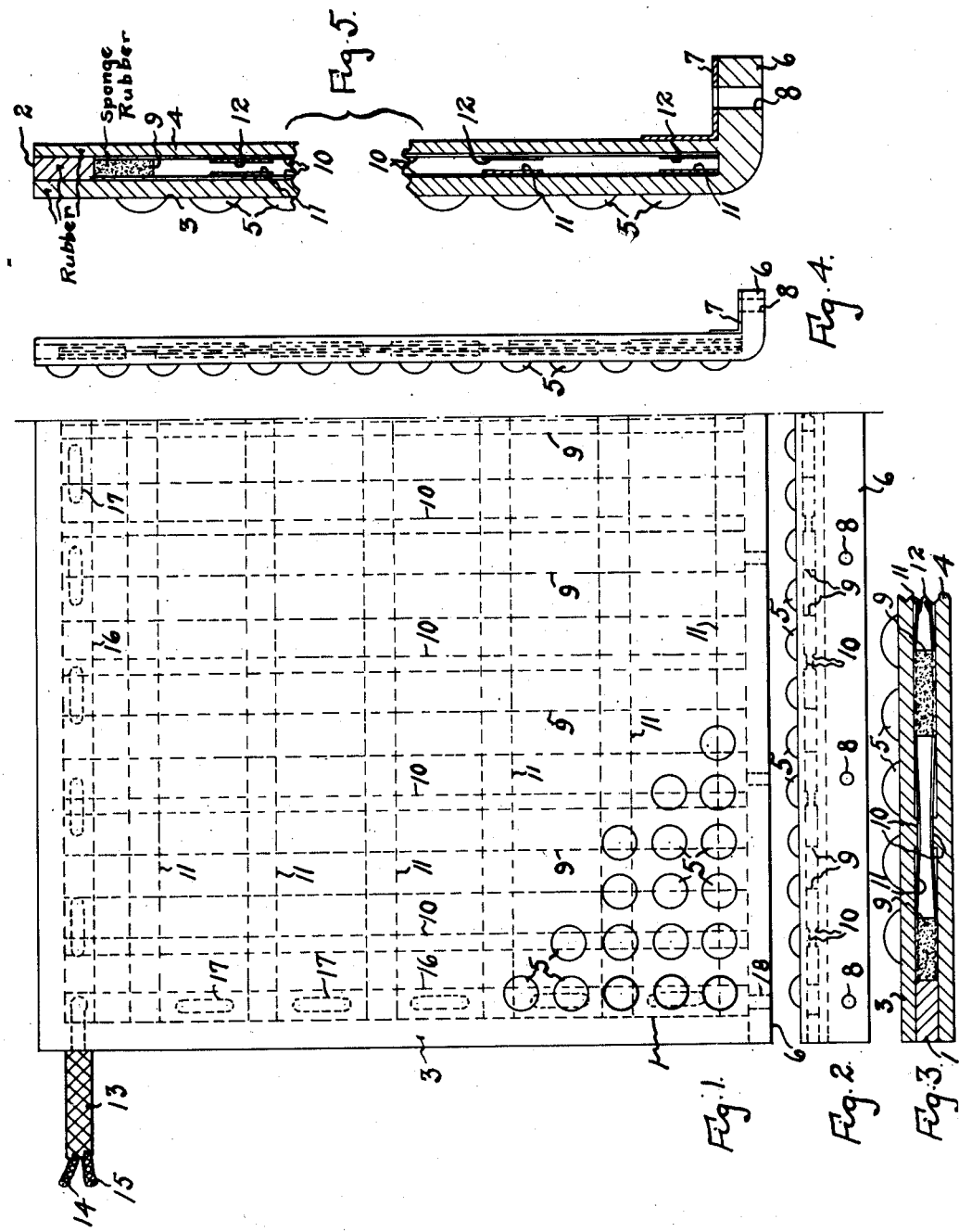
INVENTOR
Roscoe D. Conklin
BY
ATTORNEYS.

Patented June 27, 1933

1,915,292

UNITED STATES PATENT OFFICE

ROSCOE DELMAR CONKLIN, OF RAHWAY, NEW JERSEY, ASSIGNOR TO NATIONAL PNEUMATIC COMPANY, OF NEW YORK, N. Y., A CORPORATION OF WEST VIRGINIA

COMPRESSIBLE MAT ELECTRIC TREADLE

Application filed May 21, 1932. Serial No. 612,849.

This invention relates to improvements in electric treadles of the type employed on transportation vehicles in connection with the control of the doors, and also for use as a burglar mat for banks or private homes.

One of the objects of this invention is to provide a flexible or rubber mat type of electric treadle which is exceedingly simple in construction, compact in form, and relatively cheap to manufacture.

Another object of the invention is to provide an absolutely silent type of electric treadle having no loose parts to vibrate or rattle when in use.

Another object of the invention is to provide a treadle construction of such thinness that it may be readily placed directly on the floor surface adjacent the door to be controlled thereby, or on the step of a vehicle to be controlled thereby.

These and many other objects, as will appear from the following disclosure, are secured by means of this invention.

This invention resides substantially in the combination, construction, arrangement, and relative location of parts, all as will be described in complete detail in the following specification.

Referring to the drawing—

Figure 1 is a top plan view of a portion of the treadle construction of this invention;

Fig. 2 is a front elevational view thereof;

Fig. 3 is an enlarged cross-sectional view through a portion of the treadle;

Fig. 4 is an edge elevational view thereof; and

Fig. 5 is an enlarged longitudinal cross-sectional view of the treadle showing the front and edge portions with the central portion broken away.

The treadle structure comprises a flexible rubber base 4 in the form of a thin rubber sheet and a top molded flexible rubber tread 3, likewise in the form of a sheet, and provided with molded irregularities or projections 5 on the surface thereof to prevent slipping. Interposed between these two sheets along each side edge and along the rear edge are the strips 1 and 2 of flexible rubber of a tougher and less resilient nature than the rubber comprising the base sheet and the top or tread sheet. Extending longitudinally of the treadle in spaced parallel relation are sponge rubber strips 9.

As clearly shown in Fig. 5 the base sheet and the tread sheet are formed over at right angles along the front edge of the treadle and are vulcanized together to form a unitary reinforced edge 6, which may be further reinforced by means of an angle plate 7. At intervals along its edge 6 openings 8 are provided through which attaching screws or the like may be passed to secure the front edge of the treadle to the edge of the floor adjacent the door or the front edge of the step tread. These treadle mats can be made up without the angle shaped front edge so they will lie flat on the floor or under a rug for concealment.

As is clear from Fig. 3 the base sheet 4 and the tread sheet 3 are provided on their inner surfaces with longitudinally extending risers or integrally formed ridges 10 spaced medially between the sponge rubber strips 9. Extending transversely of the treadle from one side to the other are a plurality of metal contact strips 11 and 12 made preferably of phosphor bronze. These strips are anchored at the ends by reason of their attachment to the two longitudinal and one transverse metal strips 16. These strips are provided with openings or slots 17 and are positioned to overlie and underlie the edge sponge rubber strips so that the bottom sheet and tread sheet may be vulcanized to the sponge rubber strips through these openings. This secures the base sheet, tread sheet, and sponge rubber strips rigidly together into a unitary structure and anchors the strips 16 in place, likewise holding the contact strips 11 and 12 in proper position above each other. The reinforcing strips 1 and 2 of harder rubber are likewise vulcanized in place between the bottom sheet and the tread sheet. The result is a rigid, unitary, treadle structure of relatively little vertical extent. It will be noted that the contact strips 11 and 12 cross the risers 10 at right angles, which risers are positioned in vertical alignment, so that the contact strips are raised towards each other to insure positive electrical contact when the treadle is deformed by pressure thereon. The strips 10, together with their anchoring strips, form one grid terminal for the electric control circuit, and the lower strips 12 and their anchoring strips form the other grid terminal. A cable 13 is provided having the wires 14 and 15, which may be respectively connected to these parts. Thus, when one steps on the treadle at any point, contact between the grids will insure at one or more points a positive closing of the control circuit.

It will be noted that by reason of the vulcanization of all of the rubber parts together the contact strips 11 and 12, as well as the sponge rubber strips 9, are entirely enclosed and sealed within the treadle, thereby preventing the entrance of moisture and increasing the life of the structure, and particularly of the sponge rubber strips, by reason of the exclusion of air from the interior of the treadle. It is, of course, apparent that instead of forming the grids and strips as disclosed these contact grids may be made of metal screen or wire mesh of suitable construction. Where vulcanization of the parts is not desired, or where it is desired to supplement the union of the parts with additional fastening means, it is within the scope of this invention to stitch the parts together, particularly around the edge of the treadle to insure a solid construction.

From the above detailed description it will be apparent to those skilled in the art that this invention resides in certain principles of construction which may be carried out in other physical forms without departure therefrom. I do not, therefore, desire to be strictly limited to the disclosure, as given for purposes of illustration, but rather to the scope of the appended claims.

What I seek to secure by United States Letters Patent is:

1. An electric treadle as described comprising a pair of rubber plates secured together in spaced relation, one edge thereof being formed over at right angles and vulcanized together, a pair of electric contact grids secured between said plates in spaced relation, and a plurality of compressible strips interposed between said plates and grids to hold them in spaced relation, said plates having ribs on their opposed faces to hold the grids at a plurality of points out of the planes of the opposed faces of the plates to form a plurality of contact points.

2. An electric treadle as described comprising a pair of flexible rubber plates, spacer strips interposed between the plates along the sides and one edge thereof and secured thereto, the remaining edge of the plates being vulcanized together, a plurality of compressible strips interposed at spaced intervals between said plates and secured thereto, and a pair of contact grids mounted between said plates so as to be normally held in spaced relation by said strips, the inner surfaces of said plates having integral ridges for raising the grids away from the inner surfaces of the plates at a plurality of opposed points.

3. An electric treadle as described comprising flexible rubber top and bottom plates, rubber spacer strips interposed between said plates along the edges thereof and secured to the plates, the inner faces of said plates having integral ridges extending in parallel relation, a pair of contact grids and a plurality of spaced members interposed between said plates and grids to normally hold the grids out of contact, said ridges raising the grids away from the corresponding plates to provide a plurality of opposed contact points.

4. An electric treadle as described comprising flexible rubber top and bottom plates, rubber spacer strips interposed between said plates along the edges thereof and secured to the plates, the inner faces of said plates having integral ridges extending in parallel relation, a pair of contact grids having openings therethrough along the sides and a plurality of spacer members interposed between said plates and grids to normally hold the grids out of contact, said ridges raising the grids away from the corresponding plates to provide a plurality of opposed contact points, all of said rubber elements being vulcanized together to form a rigid structure, the opposed rubber surfaces at said openings being also vulcanized together to securely hold the grids in place.

In testimony whereof I have hereunto set my hand on this 17th day of May A. D., 1932.

ROSCOE DELMAR CONKLIN.